United States Patent [19]

Flueckiger

[11] 4,337,562
[45] Jul. 6, 1982

[54] METHOD OF RESTORING AN INDEXABLE CUTTING INSERT FOR REUSE

[75] Inventor: Rudolph H. Flueckiger, Rockford, Ill.

[73] Assignee: Rockford Carbide Corporation, Roscoe, Ill.

[21] Appl. No.: 138,254

[22] Filed: Apr. 7, 1980

[51] Int. Cl.³ .............................................. B23P 6/00
[52] U.S. Cl. ............................. 29/402.11; 29/402.19; 29/525; 76/101 R; 407/104; 407/120
[58] Field of Search .................. 407/36, 48, 103, 104, 407/105, 113, 114, 119, 120; 408/241 B; 76/101 A, 1, 101 R; 29/402.11, 402.19, 525

[56] References Cited

U.S. PATENT DOCUMENTS

| 2,664,617 | 1/1954 | Kralowetz | 407/113 |
| 2,744,424 | 5/1956 | Fisher | 408/241 B |
| 2,944,323 | 7/1960 | Stadler | 407/119 |
| 3,026,749 | 3/1962 | Miller et al. | 408/241 B |
| 3,121,939 | 2/1964 | Williams | 407/113 |
| 3,175,276 | 3/1965 | Weber et al. | 407/113 |
| 3,320,654 | 5/1967 | Lovendahl | 407/104 |
| 3,371,397 | 3/1968 | Coleshill et al. | 407/36 |
| 3,611,527 | 10/1971 | Hudson | 407/78 |
| 3,925,868 | 12/1975 | Singh | 407/104 |

OTHER PUBLICATIONS

Mag-Na-Cuts-Brochure from Rockford Carbide Corporation-3 pages.

Primary Examiner—Leonidas Vlachos
Assistant Examiner—Jerry Kearns
Attorney, Agent, or Firm—Leydig, Voit, Osann, Mayer & Holt, Ltd.

[57] ABSTRACT

A worn indexable cutting insert having a centrally located hole is reground to a smaller standard size. A tubular bushing is pressed into the hole to reduce the effective diameter thereof and enable a smaller locking pin to be used with the insert.

1 Claim, 5 Drawing Figures

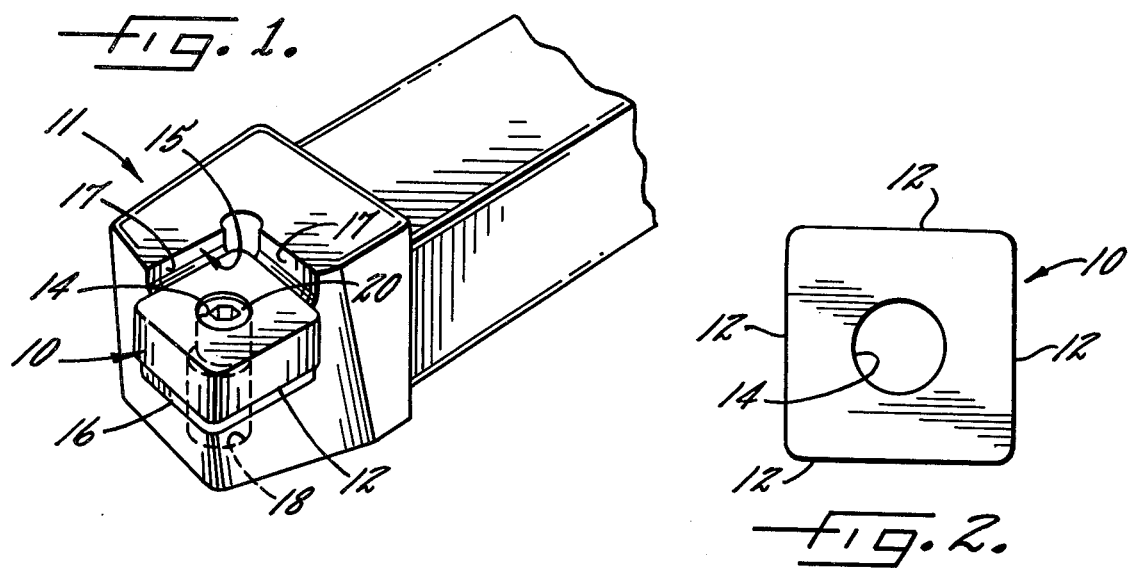
Fig. 1.
Fig. 2.
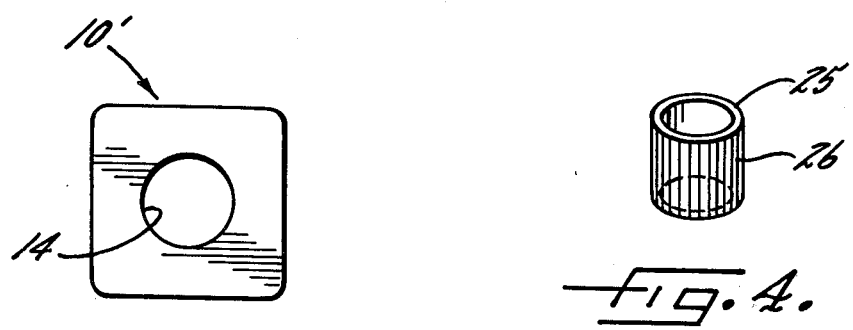
Fig. 3.
Fig. 4.
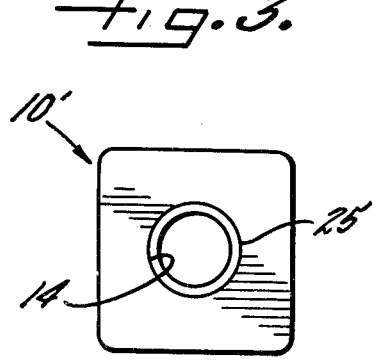
Fig. 5.

4,337,562

METHOD OF RESTORING AN INDEXABLE CUTTING INSERT FOR REUSE

BACKGROUND OF THE INVENTION

This invention relates to indexable cutting inserts of the type which are used, for example, in milling and boring cutters and in turning tools. An indexable cutting insert comprises a wafer made of cutting material such as tungsten carbide and usually having the shape of an equilateral polygon, there being a cutting edge along each side of the polygon. The insert seats within a locating pocket in the tool body and is held in the pocket by a locking pin which extends through a central hole in the insert. When one cutting edge becomes worn, the insert is turned or indexed in the pocket to bring a new cutting edge into active cutting position. After all of the cutting edges have been used, the insert usually is thrown away although, in some instances, the inserts are reground in order to renew the cutting edges.

Certain industrial dimensional standards have been established for indexable cutting inserts. For example, an insert which is shaped as a 0.75 inch square has a central pin-receiving hole with a diameter of about 0.312 inches. An insert which is shaped as a 0.625 inch square has a central hole with a diameter of about 0.250 inches. The latter insert thus uses a smaller diameter locking pin than the former insert.

SUMMARY OF THE INVENTION

The general aim of the present invention is to provide a new and improved method of renewing a worn indexable cutting insert, the method reducing the worn insert to a smaller standard size and enabling a smaller locking pin to be used with the insert.

A more detailed object is to achieve the foregoing by grinding the worn insert to form the insert into a smaller but similarly shaped polygon having fresh cutting edges and by fixing a bushing in the hole of the insert to reduce the effective diameter of the hole and to enable a smaller locking pin to extend snugly through the hole.

The invention also resides in the provision of an indexable cutting insert having a tubular bushing fixed within its central hole, the bushing preferably being fixed in the hole by a press fit.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a typical tool holder equipped with an indexable cutting insert.

FIG. 2 is a top plan view of the insert.

FIG. 3 is a view similar to FIG. 2 but shows the insert after the insert has been reground to the next smaller standard size.

FIG. 4 is a perspective view of a bushing for reducing the effective diameter of the hole of the insert shown in FIG. 3.

FIG. 5 is a view similar to FIG. 3 but shows the insert with the bushing fitted in the hole.

DETAILED DESCRIPTION OF THE PREFERRED EMBODIMENT

As shown in the drawings for purposes of illustration, the invention is embodied in an indexable cutting insert 10 which, in the present instance, is shown in conjunction with the tool holder 11 of a turning tool. The insert is in the form of a substantially flat wafer shaped as an equilateral polygon and made of tungsten carbide or other suitable cutting material.

Herein, the insert 10 is a square negative insert having a cutting edge 12 (FIG. 2) formed along each of its four sides at both the top and bottom of the insert. A centrally located cylindrical hole 14 is formed through the insert and extends between the upper and lower faces thereof.

The insert 10 is adapted to be held in a pocket 15 in the tool holder 11. As shown in FIG. 1, the pocket includes a flat platform 16 for supporting the bottom face of the insert and further includes two right angular locating walls 17 which engage two of the side faces of the insert. A threaded hole 18 is formed in the tool holder and is located so as to be in alinement with the hole 14 in the insert when the latter is seated in the pocket.

A locking pin 20 extends snugly through the hole 14 and is threaded into the hole 18 to clamp the insert 10 securely in the pocket 15. Various types of locking pins may be used as, for example, those identified by Kennametal Inc. by the trademark KENLOC or those identified by Carboloy Systems Division of The General Electric Company by the trademark CARB-O-LOCK. When one of the cutting edges 12 becomes worn, the pin 20 is released to permit the insert to be turned or indexed in the pocket to bring a new cutting edge into active cutting position. By indexing and inverting the insert, all eight cutting edges may be used.

Each of the sides of the insert 10 has a length of 0.75 inches and thus the insert embraces an inscribed circle having a diameter of 0.75 inches. The diameter of the hole 14 of the insert 10 is 0.312 inches. Certain standards have been adopted by the insert manufacturing industry and correlate the diameter of the hole with the inscribed circle of the insert. The following table is a partial summary of the standards which have been adopted for square inserts, for triangular inserts and for certain other inserts having the shape of an equilateral polygon.

| DIAMETER OF INSCRIBED CIRCLE | HOLE DIAMETER |
| --- | --- |
| 1.0" | 0.359" |
| 0.75 | 0.312 |
| 0.625 | 0.250 |
| 0.50 | 0.203 |
| 0.375 | 0.150 |

Thus, a smaller insert has a smaller central hole and uses a smaller diameter locking pin.

In accordance with the present invention, a completely worn insert is restored for re-use by reducing the size of the insert to a smaller standard size and by reducing the diameter of the central hole to the appropriate smaller standard diameter. In this way, a worn insert can be renewed for use with a different tool holder having a smaller diameter locking pin.

To explain the invention, let it be assumed that all of the cutting edges 12 of the 0.75 inch insert 10 have been worn. While it is possible to restore the cutting edges by grinding a very small amount of material from the insert, this produces an insert with a non-standard inscribed circle and results in an insert whose service life is usually shorter than that of a new insert. In carrying out the invention, these problems are avoided by grinding the edges of the worn insert until a sufficient amount of stock has been removed to reduce the insert to the next smaller size (i.e., 0.625 inches) as shown by the insert 10' in FIG. 3. Then, to standardize the hole 14 of the insert 10', the effective diameter of the hole is reduced. Preferably, this is achieved by fixing a tubular steel bushing 25 in the hole as, for example, by telescoping the bushing into the hole with a press fit. The present bushing 25 has an inside diameter of 0.250 inches and thus reduces the diameter of the hole from its original dimension of 0.312 inches to the standarized dimension for a 0.625 inch insert.

Preferably, the outer side of the bushing 25 is formed with a straight line knurl as indicated at 26 in FIG. 4, the knurl being defined by vertical ribs which alternate with vertical grooves. The effective diameter of the ribs is somewhat greater than the diameter of the hole 14 in the insert. Thus, when the bushing is pressed into the hole, the ribs either deform or are sheared away so as to insure a tight press fit of the bushing in the hole without distorting the inner diameter of the bushing.

From the foregoing, it will be apparent that the present invention brings to the art a new and improved method of restoring a worn insert for reuse by reducing the dimensions of the insert and the hole to smaller standard dimensions to enable the insert to be employed with a different tool holder having a smaller diameter locking pin. While the invention has been described specifically in conjunction with a square insert, it will be apparent that the principles of the invention are applicable to inserts having other shapes.

I claim:

1. A method of renewing and resizing a worn indexable cutting insert having the shape of a substantially equilateral polygon and having a central hole of predetermined diameter, said method comprising the steps of, grinding the insert to form the insert into a similarly shaped but smaller equilateral polygon, pressing a tubular bushing within said hole with a tight press fit to reduce the effective diameter of the hole, reducing the effective outer diameter of said bushing and maintaining the effective inner diameter of said bushing substantially constant as said bushing is pressed into said hole.

* * * * *